(No Model.)
S. A. BAKER & M. F. COLBY.
CENTRIFUGAL MACHINE.
No. 603,395. Patented May 3, 1898.
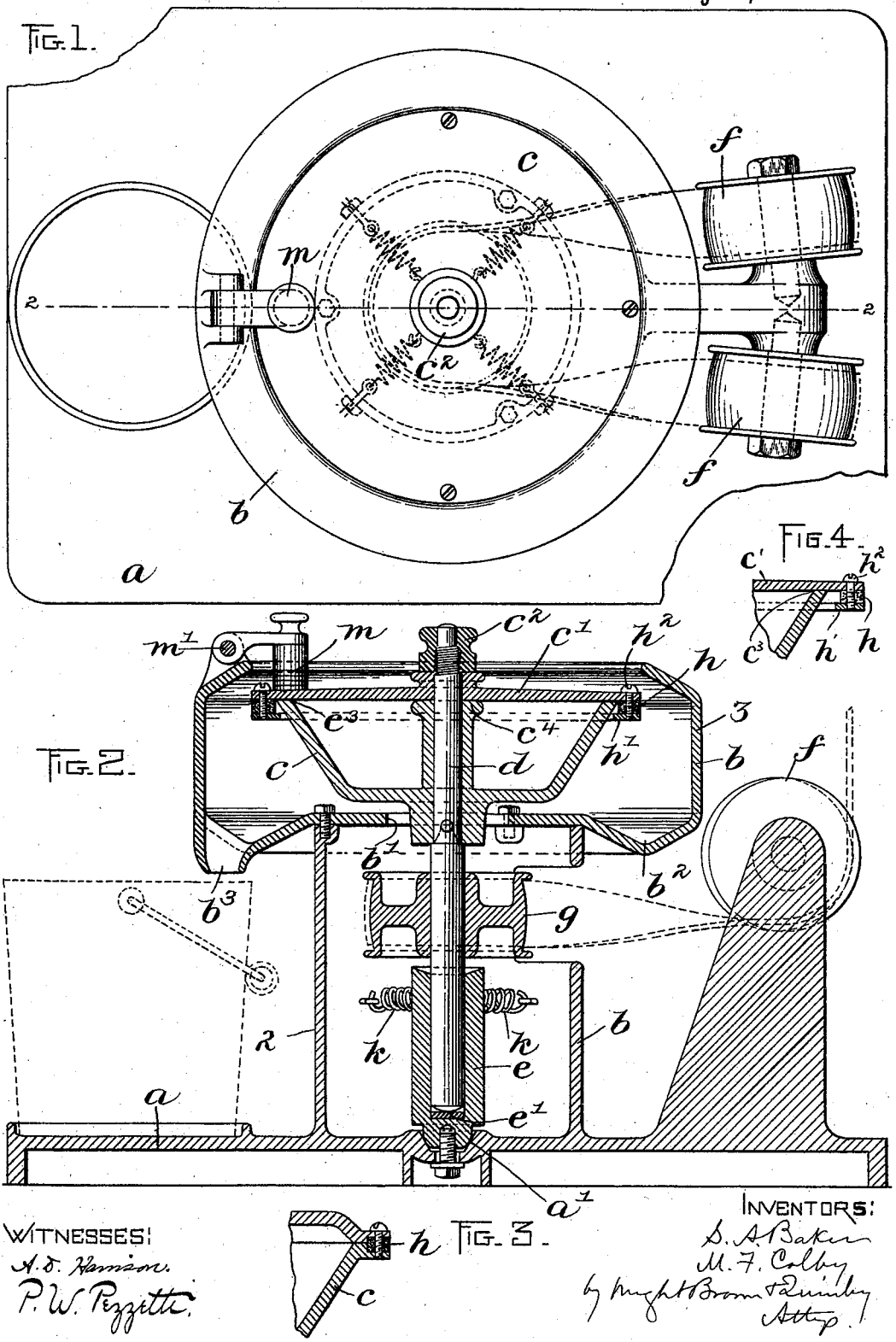

UNITED STATES PATENT OFFICE.

SAMUEL A. BAKER AND MELVIN F. COLBY, OF SPRINGFIELD, VERMONT.

CENTRIFUGAL MACHINE.

SPECIFICATION forming part of Letters Patent No. 603,395, dated May 3, 1898.

Application filed March 31, 1897. Serial No. 630,101. (No model.)

*To all whom it may concern:*

Be it known that we, SAMUEL A. BAKER and MELVIN F. COLBY, of Springfield, in the county of Windsor and State of Vermont, have invented certain new and useful Improvements in Centrifugal Separators, of which the following is a specification.

This invention relates to a centrifugal oil-separator; and it consists of an improved machine which is particularly adapted for separating machine-oil from the solid particles of metal or other substances with which it may have become mixed in machining operations.

A large quantity of oil is used in various machine-shop operations—such as drilling, tapping, &c.—and since this oil is valuable it becomes desirable to recover it from the metal particles and shavings or dirt which result from the said operations. This result is accomplished in a highly satisfactory manner by means of the improved apparatus which we will now proceed to describe and claim.

Of the accompanying drawings, forming a part of this specification, Figure 1 represents a plan view of a centrifugal separator constructed according to our invention. Fig. 2 represents a median vertical section of the same on the line 2 2 of Fig. 1. Fig. 3 shows a modified construction of certain parts. Fig. 4 shows another modified construction of the same parts.

The same letters and numerals of reference indicate the same parts in all the figures.

Referring to the drawings, $a$ designates a base on which is formed or mounted a hollow casing $b$, which contains the revolving parts. The casing $b$ comprises a lower portion 2 and an upper or wider portion 3, bolted to the portion 2 and having a central aperture $b'$ communicating therewith.

$c$ designates a receptacle or pan occupying the upper portion of the casing and mounted on a vertical shaft $d$, which has a bearing in a hollow pedestal $e$ at the bottom of the casing $b$, the shaft being stepped at $e'$ in said pedestal. The pan is rotated by means of a belt which passes around two idlers $ff$ and a pulley $g$, fixed to the shaft $d$. The said pan has a cover $c'$, which closes against the rim of the pan and whose under surface forms therewith a contracted outlet $c^3$ for liquid, the said cover being provided with a nut $c^2$, by means of which it is clamped against a central shoulder or sleeve $c^4$, formed on the pan. A filtering rim or body $h$, of felt or other fibrous material, is provided outside of the outlet $c^3$ and is held in place by means of a clamping-ring $h'$, which is attached by screw-bolts $h^2$ to the projecting rim or flange of the cover $c'$.

In operation the pan $c$, having been filled or partially filled with the mixture of oil and metal particles or dirt and the cover clamped on, is then rotated at a higher rate of speed. The centrifugal force acting on the rapidly-revolving contents of the pan forces the oil through the narrow crevice $c^3$, the larger solid particles being left in the pan. The liquid which has escaped through the crevice $c^3$ is forced against the fibrous filter $h$ and passes through the same into the upper portion 3 of the casing $b$, collecting in an annular trough $b^2$, formed in the bottom of said portion, and running out through an outlet $b^3$ into a suitable receptacle. The fibrous filter $h$ retains the finer particles of metal or dirt which may have passed through the crevice $c^3$, and the oil is collected in the trough $b^2$ in a pure and clean condition.

Fig. 3 shows a modification in which the fibrous filter $h$ is contained between flanges formed on the pan and the cover, respectively, instead of between a clamping-ring and the cover.

On account of the high speed of the rotating pan and its shaft it is undesirable to provide rigid bearings for the same, and we accordingly provide for a limited gyratory or oscillating motion of the parts by mounting the pedestal $e$, in which the shaft is stepped, in a conical socket $a'$ in the base $a$ and rounding the lower portion of the pedestal where it bears on said socket. Radial springs $k$, connecting the pedestal with the sides of the casing $b$, serve to keep said pedestal in a yieldingly upright position.

The portion 3 of the casing is open at the top to allow of the removal of the pan $c$ or its cover. $m$ represents a brake having contact-strips of leather and being pivoted at $m'$ between ears formed on the casing $b$. The brake projects over the pan $c$ and is adapted to be pressed against the cover to arrest the pan when such action becomes desirable.

The details of construction may be varied without departing from the spirit of our invention, such as making several short openings or crevices $c^3$ between the cover-surface and the pan-surface instead of a continuous circular opening and placing fibrous filter $h$ in front of each crevice.

It is obvious that our invention may be utilized for other purposes than filtering oil, its construction rendering it applicable to many mixtures of solids and liquids where it is desired to recover either the solids or the liquids.

The fibrous filter $h$ may be placed close to the edge of the pan $c$, as shown in Fig. 2, or a slight distance removed therefrom, as in Fig. 4.

We claim—

1. A centrifugal separator comprising a pan rotatable on a vertical axis and having a contracted outlet located between surfaces which are formed to arrest relatively coarse fragments or particles, and an external fibrous filter adapted to arrest the relatively fine particles that escape through said outlet with the centrifugally-expelled liquid and to permit the outward passage of said liquid, said fibrous filter being clamped between opposing annular supports adjacent to said contracted outlet.

2. A centrifugal separator comprising a pan rotatable on a vertical axis and having a contracted outlet located between surfaces which are formed to arrest relatively coarse fragments or particles, external clamping members at opposite sides of said outlet, one of which members is formed by a projecting rim or flange of the cover of the pan and a fibrous filter held by said clamping members in the path of liquid expelled centrifugally through said outlet, said filter being adapted to arrest the relatively fine particles that escape through the outlet, and to permit the outward movement of said liquid.

3. A centrifugal separator comprising a pan and cover rotatable on a vertical axis and having a contracted outlet located between surfaces which are formed to arrest relatively coarse fragments or particles, one of said surfaces being the inner side of the cover resting on the margin of the pan, said cover being extended outwardly as a clamping member beyond the margin of the pan, a complemental clamping member or ring detachably connected with the cover, and a fibrous filter interposed between said clamping members.

In testimony whereof we have signed our names to this specification, in the presence of two subscribing witnesses, this 24th day of March, A. D. 1897.

SAMUEL A. BAKER.
    MELVIN F. COLBY.

Witnesses:
 FRED C. DAVIS,
 WALTER M. WHITE.